United States Patent [19]
Oh

[11] Patent Number: 5,661,613
[45] Date of Patent: Aug. 26, 1997

[54] ROTARY TRANSFORMER CIRCUIT FOR MULTIPLE HEAD VIDEO CASSETTE RECORDER EMPLOYING A SINGLE CHANNEL ROTARY HEAD TRANSFORMER

[75] Inventor: Hyung-Hoon Oh, Seoul, Rep. of Korea

[73] Assignee: LG Electronics Inc., Seoul, Rep. of Korea

[21] Appl. No.: 402,058

[22] Filed: Mar. 10, 1995

[30] Foreign Application Priority Data

Mar. 11, 1994 [KR] Rep. of Korea ............... 4918/1994

[51] Int. Cl.$^6$ .................. G11B 15/12; G11B 15/14; G11B 5/09
[52] U.S. Cl. .................. 360/61; 360/46; 360/64
[58] Field of Search .................. 360/61, 64, 107, 360/108, 46

[56] References Cited

U.S. PATENT DOCUMENTS

| | | | |
|---|---|---|---|
| 3,959,818 | 5/1976 | Iketaki | 360/70 |
| 4,924,329 | 5/1990 | Masuda et al. | 360/64 |
| 5,291,342 | 3/1994 | Kim et al. | 360/103 |
| 5,369,534 | 11/1994 | Han | 360/64 |
| 5,434,720 | 7/1995 | Higashiyama et al. | 360/64 |

FOREIGN PATENT DOCUMENTS

| | | |
|---|---|---|
| 0110680 | 6/1984 | European Pat. Off. . |
| 93/04470 | 3/1993 | WIPO . |

OTHER PUBLICATIONS

Patent Abstracts of Japan; vol. 10 No. 7; Jan. 11, 1986; JP60163203 (Matsushita Denki Sangyo).
Patent Abstracts of Japan; vol. 10. No. 111; Apr. 25, 1986; JP60242501 (Hitachi Seisakusho).
Patent Abstracts of Japan; vol. 10 No. 149; May 30, 1986; JP61003302 (Hitachi Seisakusho).
Patent Abstracts of Japan; vol. 10 No. 408; Jul. 29, 1993; JP5074002 (Sanyo Electric Co., Ltd.).

*Primary Examiner*—Aristotelis M. Psitos
*Assistant Examiner*—Regina Y. Neal

[57] ABSTRACT

A rotary transformer circuit, for a video cassette recorder, including: a single rotary transformer; a plurality of magnetic heads for recording/playing back signals on the magnetic tape; and a switching circuit for selectively sampling each of the plurality of magnetic heads and for forming a signal of concatenated individual-head sub-signals and for selectively connecting a signal of concatenated individual-head sub-signals to corresponding ones of the plurality of magnetic heads. The switching circuit transferring the signal of concatenated individual-head sub-signals through the single rotary transformer. The circuit avoids noise caused by cross-talk when using multiple rotary transformers.

15 Claims, 4 Drawing Sheets

ROTARY TRANSFORMER CIRCUIT FOR MULTIPLE HEAD VIDEO CASSETTE RECORDER EMPLOYING A SINGLE CHANNEL ROTARY HEAD TRANSFORMER

BACKGROUND OF THE INVENTION

1. Field of the Invention

The present invention relates in general to a rotary transformer circuit for a video cassette recorder, and more particularly to a single channel rotary transformer circuit for switching a plurality of magnetic heads. The magnetic heads travel over tracks of a magnetic tape in order to record signals on the magnetic tape, to play back signals recorded on the magnetic tape, and to transmit recording/playback signals to/from the magnetic heads through a single channel.

2. Description of the Prior Art

Generally, a rotary transformer circuit is used in a recording/playback system such as a video cassette recorder (referred to hereinafter as VCR), a camcorder, a digital audio tape recorder and etc. to transmit signals read from a plurality of magnetic heads to a plurality of head amplifiers. Such a conventional rotary transformer circuit comprises a plurality of rotary transformers, each of which has a rotor and a stator. The rotor and stator have a free space in the order of several tens of μm therebetween, in which are formed channel grooves corresponding to the number of channels and a short ring groove into which a short ring is mounted to reduce an inter-channel signal interference.

In a playback mode, the rotor rotates to transfer a signal read from a corresponding one of the magnetic heads to the stator, which then transmits the signal from the rotor to a playback pre-amplifier through a coil. In a recording mode, a signal from a recording amplifier is transferred from the stator to the rotor.

Referring to FIG. 1, there is shown a schematic block diagram of a conventional multi-channel rotary transformer circuit for a VCR. As shown in this drawing, the conventional multi-channel rotary transformer circuit comprises a head section 10, a rotary transformer section 20, a head amplification section 30, a channel switching section 40 and a microcomputer 50.

The head section 10 includes a plurality of magnetic heads a–d for recording signals on a magnetic tape (not shown) and playing back signals recorded on the magnetic tape.

The rotary transformer section 20 is adapted to transfer output signals from the head section 10 to the head amplification section 30. Also, the rotary transformer section 20 transfers output signals from the head amplification section 30 to the head section 10. To this end, the rotary transformer section 20 includes a plurality of rotary transformers 21–24 of channels of the number equal to that of the magnetic heads a–d in the head section 10. Each of the rotary transformers 21–24 connects a corresponding one of the magnetic heads a–d in the head section 10 to a corresponding one of a plurality of recording/playback amplifier circuits 31–34 in the head amplification section 30. Each of the records/playback amplifier circuits 31–34 includes an amplifier.

Each of the recording/playback amplifiers 31–34 in the head amplification section 30 amplifies an output signal from the corresponding one of the rotary transformers 21–24 in the rotary transformer section 20 by a predetermined level and outputs the amplified signal to the channel switching section 40. Each of the recording/playback amplifier circuits 31–34 also transfers an output signal from the channel switching section 40 to the corresponding one of the rotary transformers 21–24 in the rotary transformer section 20.

The microcomputer 50 is adapted to generate a switching pulse signal in response to a drum pulse signal which is generated by a servo circuit (not shown) whenever a drum rotates once. The microcomputer 50 outputs the generated switching pulse signal to the channel switching section 40.

The channel switching section 40 is switched in response to the switching pulse signal from the microcomputer 50 to transfer a selected one of the output signals from the head amplification section 30 to a video/audio processing circuit (not shown). Also, the channel switching section 40 is switched in response to the switching pulse signal from the microcomputer 50 to transfer an output signal from the video/audio processing circuit to the head amplification section 30. To this end, the channel switching section 40 includes switches 41 and 42.

The operation of the conventional multi-channel rotary transformer circuit for the VCR with the above-mentioned construction will hereinafter be described with reference to FIGS. 2A to 2H which are waveform diagrams of the output signals from the components in FIG. 1.

First, in the playback mode, the magnetic heads a–d in the head section 10 travel on tracks of the magnetic tape to read sequentially the signals recorded on the magnetic tape. Then, the magnetic heads a–d output the read signals to the rotary transformers 21–24 in the rotary transformer section 20, respectively. The rotary transformers 21–24 transfer the output signals from the magnetic heads a–d to the recording/playback amplifier circuits 31–34 in the head amplification section 30, respectively. Each of the recording/playback amplifier circuits 31–34 amplifies the output signal from the corresponding one of the rotary transformers 21–24 in the rotary transformer section 20 by the predetermined level and outputs the amplified signal to the channel switching section 40.

The switching pulse signal as shown in FIG. 2A is applied from the microcomputer 50 to the channel switching section 40. When the switching pulse signal from the microcomputer 50 is low in logic, movable terminals of the switches 41 and 42 in the channel switching section 40 are connected to one of the terminals thereof as shown by solid lines in FIG. 1. As a result, the output signals from the magnetic heads a and c are selected as shown in FIGS. 2B and 2C and combined as shown in FIG. 2D. The combined signal as shown in FIG. 2D is then transferred to an input/output terminal by the switches 41 and 42. On the contrary, in the case where the switching pulse signal from the microcomputer 50 is high in logic, the movable terminals of the switches 41 and 42 are connected to the other terminals thereof as shown by dotted lines in FIG. 1. As a result, the output signals from the magnetic heads b and d are selected as shown in FIGS. 2E and 2F and combined as shown in FIG. 2G. The combined signal as shown in FIG. 2G is then transferred to the input/output terminal by the switches 41 and 42.

In result, a radio frequency (referred to hereinafter as RF) signal as shown in FIG. 2H is transferred to the video/audio processing circuit (not shown) through the input/output terminal in response to the switching pulse signal as shown in FIG. 2A.

On the other hand, in the recording mode, a recording signal as shown in FIG. 2H is applied from the video/audio processing circuit (not shown) to the channel switching section 40 through the input/output terminal. At this time, the switches 41 and 42 in the channel switching section 40 are switched in a similar manner to the playback mode in response to the switching pulse signal from the microcomputer 50. As a result, the signals as shown in FIGS. 2B, 2C, 2E and 2F are transferred from the switches 41 and 42 to the recording/playback amplifiers 31–34 in the head amplification section 30, respectively. Then, the signals as shown in FIGS. 2B, 2C, 2E and 2F are amplified by the recording/playback amplifier circuits 31–34 in the head amplification section 30 and transferred through the rotary transformers 21–24 in the rotary transformer section 20 to the magnetic heads a–d in the head section 10, respectively. In result, travelling on the tracks of the magnetic tape, the magnetic heads a–d record sequentially the transferred signals on the magnetic tape.

However, in the above-mentioned conventional multi-channel rotary transformer circuit for a VCR, a signal-to-noise (S/N) ratio is degraded due to an inter-channel signal interference resulting from an increase in the number of channels because each magnetic head corresponds to one channel. Also, a short ring must be designed to shield the inter-channel signal interference. Further, the number of the head amplifiers being used is the same as that of the magnetic heads, resulting in a complexity in the manufacturing process and an increase in the manufacturing cost.

SUMMARY OF THE INVENTION

Therefore, the present invention has been made in view of the above problems, and it is an object of the present invention to provide a single channel rotary transformer circuit for a VCR for switching a plurality of magnetic heads to transmit recording/playback signals to/from the magnetic heads through a single channel.

In accordance with the present invention, the above and other objects can be accomplished by a provision of a single channel rotary transformer circuit for a video cassette recorder, comprising head means including a plurality of magnetic heads for recording signals on a magnetic tape and playing back signals recorded on the magnetic tape; switching means for selecting a desired one of the plurality of magnetic heads in the head means; recording/playback amplification means for amplifying a playback signal from the switching means and a recording signal to be transferred to the switching means; and single channel rotary transformer means for transferring the playback signal from the switching means to the recording/playback amplification means and the recording signal from the recording/playback amplification means to the switching means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
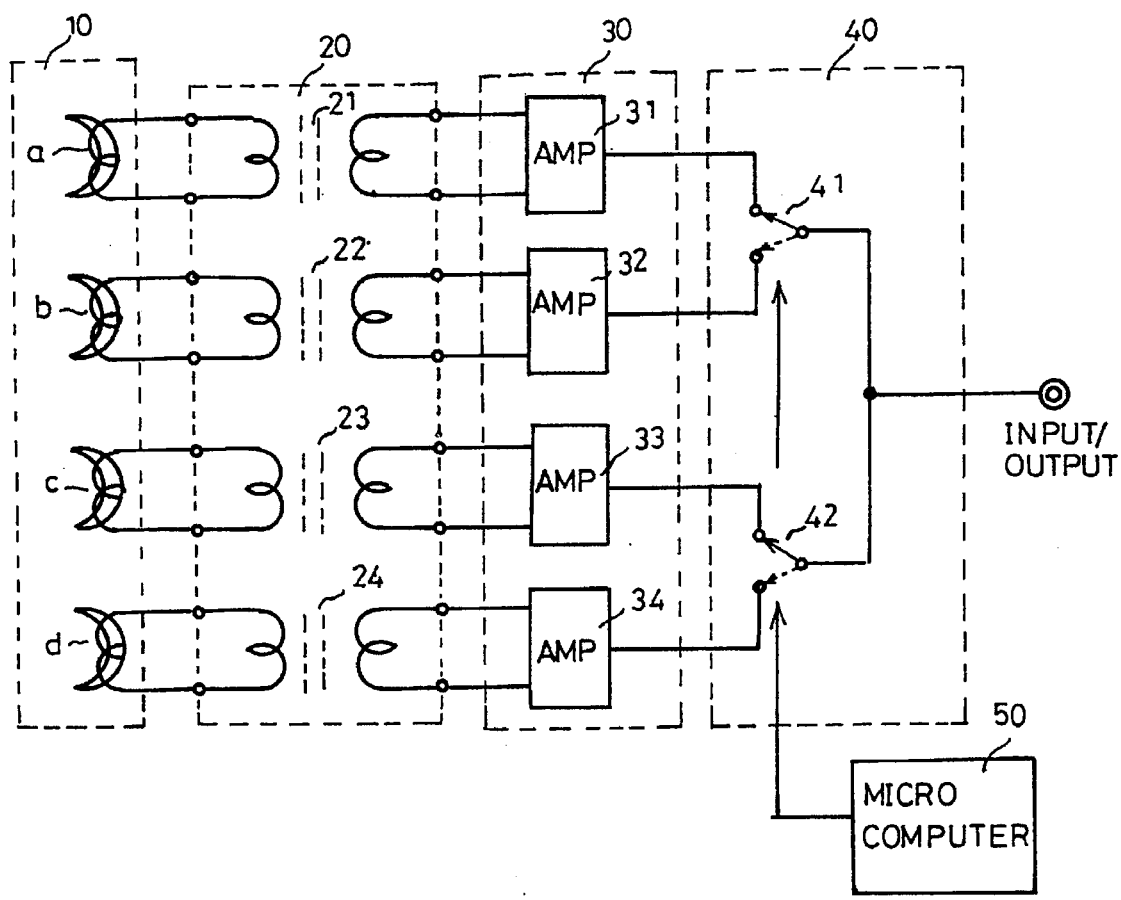
FIG. 1 is a schematic block diagram of a conventional multi-channel rotary transformer circuit for a VCR.
Figure 2A:
FIGS. 2A to 2H are waveform diagrams of output signals from components in FIG. 1.
Figure 2B:
Figure 2C:
Figure 2D:
Figure 2E:
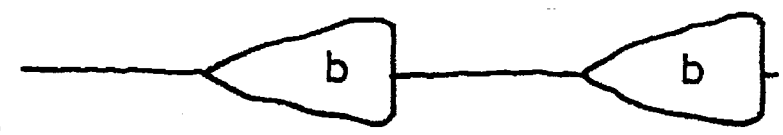
Figure 2F:
Figure 2G:
Figure 2H:
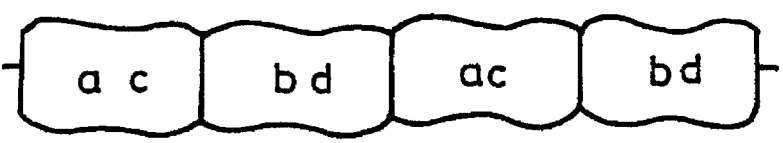
Figure 3:
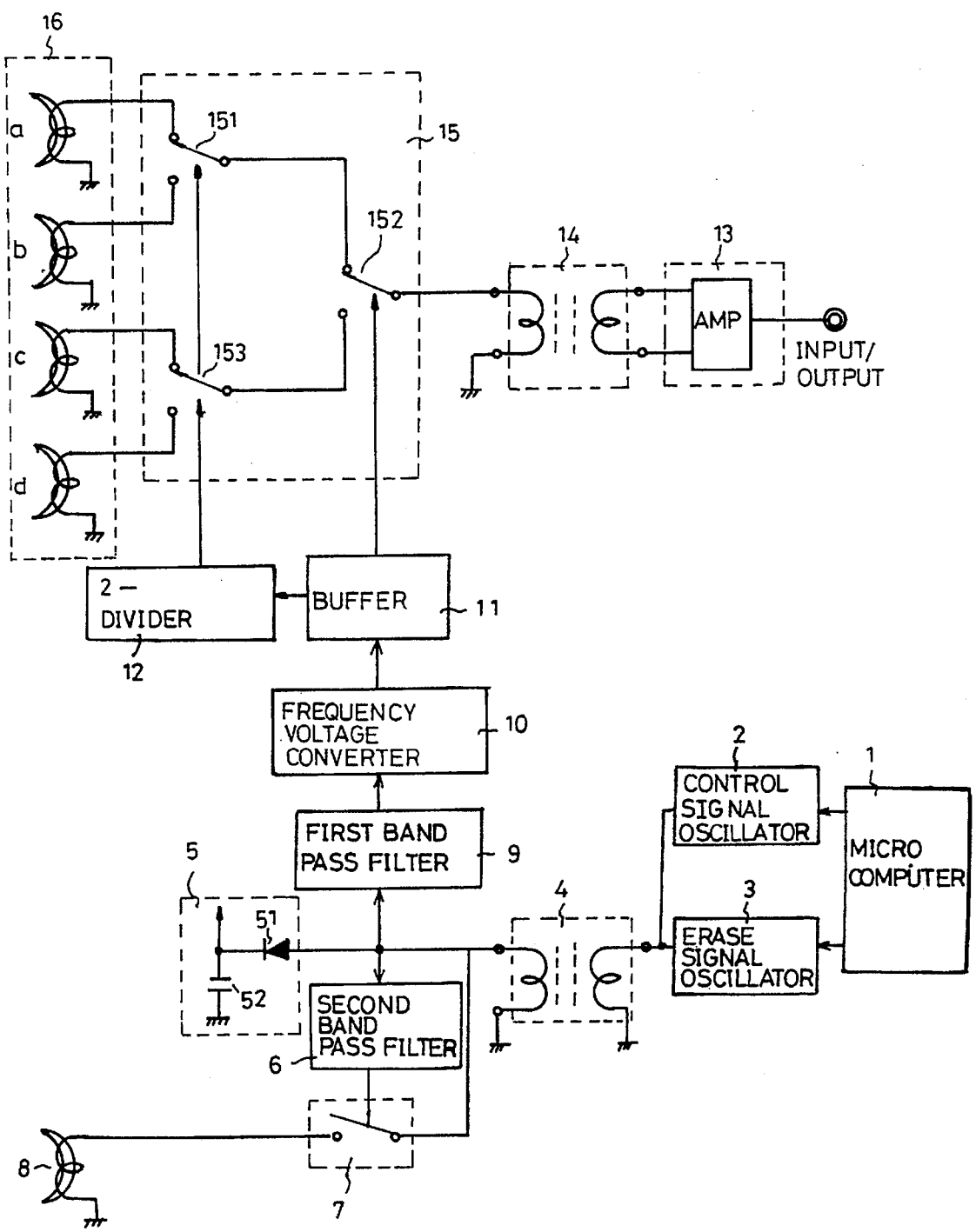
FIG. 3 is a schematic block diagram of a single channel rotary transformer circuit for a VCR in accordance with the present invention.

Referring to FIG. 3, there is shown a schematic block diagram of a single channel rotary transformer circuit for a VCR in accordance with the present invention. As shown in this drawing, the single channel rotary transformer circuit comprises a microcomputer 1 for generating a head switching signal and recording/playback flags to control recording/playback operations, a control signal oscillator 2 for generating a control oscillating signal in response to the head switching signal from the microcomputer 1, an erase signal oscillator 3 for generating an erase oscillating signal in response to the recording/playback flags from the microcomputer 1, and a first rotary transformer 4 for transferring a signal into which the control oscillating signal from the control signal oscillator 2 and the erase oscillating signal from the erase signal oscillator 3 are combined, to first and second band pass filters 9 and 6 and a power supply circuit 5.

The power supply circuit 5 is adapted to supply power to a drum rotating circuit (not shown) in response to an output signal from the first rotary transformer 4. To this end, the power supply circuit 5 includes a diode 51 for rectifying the output signal from the first rotary transformer 4, and a condenser 52 for smoothing the rectified signal from the diode 51.

The second band pass filter 6 is adapted to filter the output signal from the first rotary transformer 4 at an erase signal frequency band. The first band pass filter 9 is adapted to filter the output signal from the first rotary transformer 4 at a control signal frequency band.

The single channel rotary transformer circuit further comprises an erase switch 7 being switched in response to an output signal from the second band pass filter 6, an erase magnetic head 8 for erasing signals recorded on a magnetic tape in response to an output signal from the erase switch 7, a frequency/voltage converter 10 for converting an output signal from the first band pass filter 9 into a voltage signal, a buffer 11 for buffering an output signal from the frequency/voltage converter 10, a 2-divider 12 for dividing a period of an output signal from the buffer 11 by 2, and a head section 16 for recording signals on the magnetic tape and reading the signals recorded on the magnetic tape. An output signal from the 2-divider 12 is applied as a switching control signal to first and second select switches 151 and 153 in a switching section 15, and the output signal from the frequency/voltage converter 10 is applied as a switching control signal to a third select switch 152 in the switching section 15. The head section 16 includes a plurality of magnetic heads a–d for recording the signals on the magnetic tape and reading the signals recorded on the magnetic tape.

The switching section 15 is switched in response to the output signal from the buffer 11 and the output signal from the 2-divider 12 to transfer an output signal from the head section 16 to a second rotary transformer 14. Also, the switching section 15 is switched in response to the output signal from the buffer 11 and the output signal from the 2-divider 12 to transfer an output signal from the second rotary transformer 14 to the head section 16. To this end, the switching section 15 includes the first to third select switches 151, 153 and 152. The first select switch 151 is switched in response to the output signal from the 2-divider 12 to select one of output signals from the magnetic heads a and b in the head section 16. The second select switch 153 is switched in response to the output signal from the 2-divider 12 to select one of output signals from the magnetic heads c and d in the head section 16. The third select switch 152 is switched in response to the output signal from the buffer 11 to select one of output signals from the first and second select switches 151 and 153.

The second rotary transformer 14 is adapted to transfer an output signal from the switching section 15 to a recording/ playback amplifier circuit 13 having an amplifier. Also, the second rotary transformer 14 transfers an output signal from the recording/playback amplifier 13 to the switching section 15. The recording/playback amplifier circuit 13 is adapted to amplify an output signal from the second rotary transformer 14 by a predetermined level and output the amplified signal to an input/output terminal. Also, the recording/playback amplifier circuit 13 amplifies an output signal from the input/output terminal by the predetermined level and outputs the amplified signal to the second rotary transformer 14.

The operation of the single channel rotary transformer circuit for the VCR with the above-mentioned construction in accordance with the present invention will hereinafter be described in detail with reference to FIGS. 4A to 4I which are waveform diagrams of the output signals from the components in FIG. 3.

Figure 4A:
FIGS. 4A to 4I are waveform diagrams of output signals from components in FIG. 3.
Figure 4B:
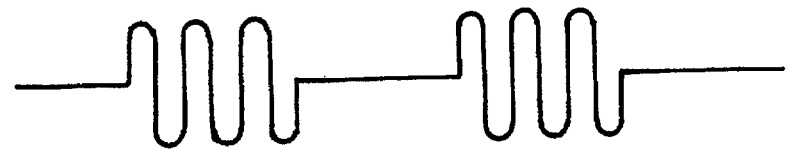

First, in a playback mode, the magnetic heads a–d in the head section 16 travel on tracks of the magnetic tape to read sequentially the signals recorded on the magnetic tape. At this time, the microcomputer 1, which controls the rotation of a head drum (not shown), outputs the head switching signal as shown in FIG. 4A to the control signal oscillator 2. The microcomputer 1 also outputs the playback flag "0" to the erase signal oscillator 3. When the head switching signal from the microcomputer 1 is high in logic, the control signal oscillator 2 outputs the control oscillating signal as shown in FIG. 4B. The erase signal oscillator 3 outputs a playback oscillating frequency signal fp in response to the playback flag "0" from the microcomputer 1, the playback oscillating frequency signal fp having a frequency lower than that of a recording oscillating frequency signal fn.

Figure 4C:
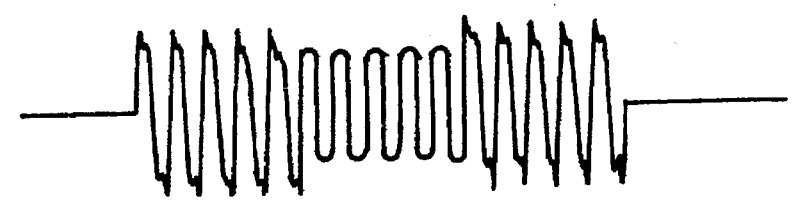

The control oscillating signal from the control signal oscillator 2 and the playback oscillating frequency signal fp from the erase signal oscillator 3 are combined as shown in FIG. 4C and then transferred through the first rotary transformer 4 to the first and second band pass filters 9 and 6 and the power supply circuit 5. In the power supply circuit 5, the combined signal is rectified by the diode 51 and smoothed by the condenser 52. The resultant direct current (referred to hereinafter as DC) voltage signal is supplied to the drum rotating circuit. Also, the combined signal is not filtered at a recording oscillating frequency band by the second band pass filter 6.

Figure 4D:

Also, the combined signal is filtered at the control signal frequency band by the first band pass filter 9 and the resultant signal as shown in FIG. 4B is applied to the frequency/voltage converter 10. The frequency/voltage converter 10 converts the output frequency signal from the first band pass filter 9 into the voltage signal as shown in FIG. 4D and outputs the converted voltage signal to the buffer 11.

Figure 4E:

The buffer 11 buffers the output signal from the frequency/voltage converter 10 and outputs the resultant signal as shown in FIG. 4E to the 2-divider 12 and the third select switch 152 in the switching section 15.

Figure 4F:

The 2-divider 12 divides the period of the output signal from the buffer 11 by 2 and outputs the resultant signal as shown in FIG. 4F to the first and second select switches 151 and 153 in the switching section 15.

Figure 4G:
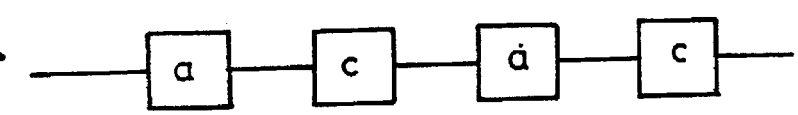
Figure 4H:
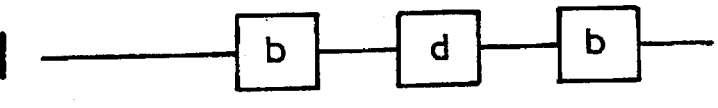
Figure 4I:
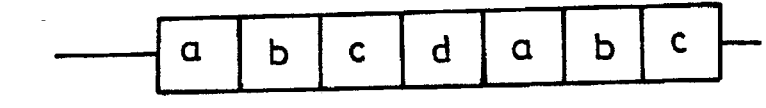

When the output signal from the 2-divider 12 as shown in FIG. 4F is high in logic, the first and second select switches 151 and 153 select the output signal from the magnetic head a and the output signal from the magnetic head c, respectively. On the contrary, when the output signal from the 2-divider 12 as shown in FIG. 4F is low in logic, the first and second select switches 151 and 153 select the output signal from the magnetic head b and the output signal from the magnetic head d, respectively. As a result, the first and second select switches 151 and 153 output the resultant signals as shown in FIGS. 4G and 4H to the third select switch 152, respectively. Also, when the output signal from the buffer 11 as shown in FIG. 4E is high in logic, the third select switch 152 selects the output signals from the magnetic heads a and b transferred through the first select switch 151. On the contrary, when the output signal from the buffer 11 as shown in FIG. 4E is low in logic, the third select switch 152 selects the output signals from the magnetic heads c and d transferred through the second select switch 153. As a result, the third select switch 152 outputs the resultant signal as shown in FIG. 4I to the second rotary transformer 14. In result, the output signals from the magnetic heads a–d in the head section 16 are sequentially applied to the second rotary transformer 14 through the switching section 15. Then, the output signal from the switching section 15 as shown in FIG. 4I is transferred to the recording/playback amplifier circuit 13 through the second rotary transformer 14. The recording/playback amplifier circuit 13 amplifies the output signal from the second rotary transformer 14 by the predetermined level and outputs the amplified signal to a video/audio processing circuit (not shown) through the input/output terminal.

On the other hand, in a recording mode, the microcomputer 1, which controls the rotation of the head drum (not shown), outputs the head switching signal as shown in FIG. 4A to the control signal oscillator 2. The microcomputer 1 also outputs the recording flag "1" to the erase signal oscillator 3. When the head switching signal from the microcomputer 1 is high in logic, the control signal oscillator 2 outputs the control oscillating signal as shown in FIG. 4B. The erase signal oscillator 3 outputs the recording oscillating frequency signal fn in response to the recording flag "1" from the microcomputer 1.

The control oscillating signal from the control signal oscillator 2 and the recording oscillating frequency signal fn from the erase signal oscillator 3 are combined as shown in FIG. 4C and then transferred through the first rotary transformer 4 to the first and second band pass filters 9 and 6 and the power supply circuit 5. In the power supply circuit 5, the combined signal is rectified by the diode 51 and smoothed by the condenser 52. The resultant DC voltage signal is supplied to the drum rotating circuit. Also, the combined signal is filtered at the recording oscillating frequency band by the second band pass filter 6, thereby causing the erase switch 7 to be turned on. As the erase switch 7 is turned on, the erase magnetic head 8 erases the signals recorded on the magnetic tape.

Also, the combined signal is filtered at the control signal frequency band by the first band pass filter 9 and then applied as the switching control signals to the first to third select switches 151, 153 and 152 in the switching section 15 in the same manner as that in the playback mode.

On the other hand, an output signal from the video/audio processing circuit (not shown) is applied to the recording/playback amplifier circuit 13 through the input/output terminal. The output signal from the video/audio processing circuit is amplified by the predetermined level by the recording/playback amplifier circuit 13 and then applied to the switching section 15 through the second rotary transformer 14. In the switching section 15, the first to third select switches 151, 153 and 152 are switched in response to the output signal from the 2-divider 12 and the output signal from the buffer 11 to drive the corresponding magnetic hems. As a result, the output signal from the video/audio processing circuit is recorded on the magnetic tape.

As apparent from the above description, according to the present invention, the single channel rotary transformer circuit is capable of switching the plurality of magnetic heads to transmit the recording/playback signals to/from the magnetic heads through the single channel. Therefore, an RF circuit can be simplified in construction as compared with the conventional multi-channel rotary transformer circuit. Also, there is no necessity for designing a short ring to shield an inter-channel signal interference. Further, the reduced number of recording/playback amplifiers has the effect of reducing the manufacturing cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A single channel rotary transformer circuit for a video cassette recorder having a plurality of magnetic heads for recording/playing-back signals on a magnetic tape, comprising:

switching means for selecting a desired one of said plurality of magnetic heads;

recording/playback amplifier means for amplifying recording/playback signals from said switching means;

single channel rotary transformer means, connected between said switching means and said recording/playback amplifier means, for transferring signals between said switching means and said recording/playback amplifier means;

a controller for generating signals for controlling head switching;

control signal oscillator means for generating only a control oscillating signal in response to a head switching control signal from the controller;

a rotary transformer for transferring the control oscillating signal output from the control signal oscillator means; and a power supply circuit for supplying power to rotate a head drum of the video cassette recorder in response to the signal transferred from the rotary transformer.

2. A single channel rotary transformer circuit for a video cassette recorder as set forth in claim 1, wherein:

the switching means selects a desired one of said plurality of magnetic heads in accordance with control means, the control means including:

first bandpass filter means for filtering the signal transferred from the rotary transformer at a control frequency band;

frequency/voltage converter means for converting an output signal from the first bandpass filter means into a frequency-dependent voltage;

buffer means for buffering an output signal of said frequency/voltage converter means and outputting the buffered signal to said switching means as a first switching control signal for controlling switching of the switching means; and signal period divider means for dividing a period of an output signal of said buffer means and outputting the period-divided signal to said switching means as a second switching control signal for controlling switching of the switching means.

3. A single channel rotary transformer circuit for a video cassette recorder as set forth in claim 2, wherein the power supply circuit includes a diode and a capacitor.

4. A circuit as in claim 1, wherein: the switching means includes a plurality of switches.

5. A single channel rotary transformer circuit for a video cassette recorder as set forth in claim 4, wherein the power supply circuit includes a diode and a capacitor.

6. A single channel rotary transformer circuit for a video cassette recorder as set forth in claim 5, further comprising:

first bandpass filter means for filtering the signal transferred from the rotary transformer at a control frequency band;

frequency/voltage converter means for converting an output signal from the first bandpass filter means into a frequency-dependent voltage;

buffer means for buffering an output signal of said frequency/voltage converter means and outputting the buffered signal to said switching means as a first switching control signal for controlling switching of the switching means; and signal period divider means for dividing a period of an output signal of said buffer means and outputting the period-divided signal to said switching means as a second switching control signal for controlling switching of the switching means.

7. A single channel rotary transformer circuit for a video cassette recorder as set forth in claim 1, wherein:

the switching means selects a desired one of said plurality of magnetic heads in accordance with control means, the control means including:

the controller controlling a recording operation and a playback operation;

erase signal oscillator means for generating an erase oscillating signal in response to a recording and playback operation control signal from the controller;

the rotary transformer for transferring the erase oscillating signal output from the erase signal oscillator means;

first bandpass filter means for filtering the signals transferred from the rotary transformer at a control frequency band;

second bandpass filter means for filtering the signals transferred from the rotary transformer at an erase frequency band;

frequency/voltage converter means for converting an output signal from the first bandpass filter means into a frequency-dependent voltage;

buffer means for buffering an output signal of said frequency/voltage converter means and outputting the buffered signal to said switching means as a first switching control signal for controlling switching of the switching means; and signal period divider means for dividing a period of an output signal of said buffer means and outputting the period-divided signal to said switching means as a second switching control signal for controlling switching of the switching means.

8. A single channel rotary transformer circuit for a video cassette recorder as set forth in claim 1, further comprising:

erase signal oscillator means for generating an erase signal in response to a recording and playback operation control signal from the controller;

bandpass filter means for filtering the signal transferred by the rotary transformer at an erase frequency band;

erase switch means for switching the signal filtered by said bandpass filter means in response to the erase signal; and erase head means for erasing signals recorded on a magnetic tape in response to the erase signal from the erase switch means.

9. A device for recording/playing-back video signals on a magnetic tape, the device comprising:

a plurality of recording/playback heads;

concatenator means, operatively connected to the plurality of heads, for selectively selecting each of the heads and for forming a signal of concatenated individual-head sub-signals from the heads, and for receiving a signal of concatenated individual-head sub-signals and for selectively connecting the signal of concatenated individual-head sub-signals to corresponding ones of the plurality of heads; and a controller for supplying switching signals to the concatenator means, wherein the controller supplies the switching signals based upon a primary switching signal, the controller forming at least one other switching signal by dividing the period of the primary switching signal by ½N, where N is the number of heads.

10. A device as in claim 9, further comprising:

a rotary transformer transferring the signal of concatenated individual-head sub-signals to/from the concatenator means.

11. A device as in claim 10, further comprising:

an amplifier, operatively connected to the rotary transformer, amplifying, during a playback mode, the signal of concatenated individual-head sub-signals.

12. A device as in claim 9, wherein:

the concatenator means includes a plurality of controllable switches, the controller supplying the switching signals to the plurality of controllable switches.

13. A device as in claim 12, wherein:

the number of heads is four;

wherein the number of switches is three;

wherein a first switch selectively connects a first head and a second head to a first signal;

wherein a second switch selectively connects a third head and a fourth head to a second signal;

wherein a third switch selectively connects the first signal line and the second signal line to an output of the concatenator.

14. A device as in claim 13, wherein:

the controller causes the first switch to operate synchronously with the second switch and causes both of the first and second switches to operate asynchronously with the third switch.

15. A device as in claim 9, wherein:

the number of heads is four; and the controller divides the primary switching signal by two to get the at least one other switching signal.

* * * * *